United States Patent
Maeda (10) Patent No.: US 8,169,503 B2
(45) Date of Patent: May 1, 2012

(54) IMAGE PICKUP APPARATUS AND CONTROL METHOD FOR SELECTING A FLICKER CONTROL METHOD

(75) Inventor: Muneyoshi Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 12/242,449

(22) Filed: Sep. 30, 2008

(65) Prior Publication Data

US 2009/0086054 A1 Apr. 2, 2009

(30) Foreign Application Priority Data

Oct. 2, 2007 (JP) .................................. 2007-258887

(51) Int. Cl.
*H04N 9/73* (2006.01)

(52) U.S. Cl. ............... 348/228.1; 348/226.1; 348/229.1; 348/222.1; 348/366

(58) Field of Classification Search ............... 348/226.1, 348/228.1

See application file for complete search history.

(56) References Cited

U.S. PATENT DOCUMENTS

| | | | |
|---|---|---|---|
| 2003/0184661 A1* | 10/2003 | Yubata et al. | 348/229.1 |
| 2005/0206745 A1* | 9/2005 | Daiku et al. | 348/226.1 |
| 2006/0232687 A1 | 10/2006 | Ono et al. | |
| 2007/0046790 A1* | 3/2007 | Nakasuji et al. | 348/226.1 |

FOREIGN PATENT DOCUMENTS

| | | |
|---|---|---|
| JP | 63-202187 A | 8/1988 |
| JP | 2006-303815 A | 11/2006 |

* cited by examiner

*Primary Examiner* — Sinh Tran
*Assistant Examiner* — Paul Berardesca
(74) *Attorney, Agent, or Firm* — Canon U.S.A., Inc., IP Division (57) ABSTRACT

It is determined whether or not flicker has occurred in an image signal obtained on the basis of an output signal of an image pickup element. If it is determined that flicker has occurred, a flicker correction method is selected according to a gain value set in the image signal.

2 Claims, 6 Drawing Sheets

IMAGE PICKUP APPARATUS AND CONTROL METHOD FOR SELECTING A FLICKER CONTROL METHOD

BACKGROUND OF THE INVENTION

1. Field of the Invention

The present invention relates to an image pickup apparatus having a flicker correction function for suppressing occurrence of flicker in an image signal captured by an XY address image pickup element such as a complementary metal-oxide semiconductor (CMOS) sensor, and to a control method for the image pickup apparatus.

2. Description of the Related Art

Image signals captured using existing image pickup apparatuses including image pickup elements such as charge-coupled device (CCD) sensors or CMOS sensors may include flicker. No flicker occurs when images are captured in light source environments where the amount of light emitted from a light source is constant and unchanged, such as sunlight.

Flicker occurs, for example, in a case where a light source having a light emission characteristic (brightness) that changes at a constant frequency, such as a fluorescent lamp, is used and in a case where a cycle in which the brightness of the light source changes is not synchronized with a sampling frequency of an electronic shutter of an image pickup element (a timing of an accumulation period).

Flicker is a phenomenon in which due to a deviation between the timing of changes in brightness of a light source in a photographic environment and the timing of electric charge accumulation of an image pickup element, periodic differences in brightness occur on a generated output image. There are two types of flicker depending on the electric charge accumulation method of the image pickup element.

In CCD sensors, a global shutter system in which the timing of electric charge accumulation is matched in units of surfaces of image pickup elements is employed. Thus, the brightness changes field by field, i.e., in units of generated output images (referred to as field flicker).

Figure 4:
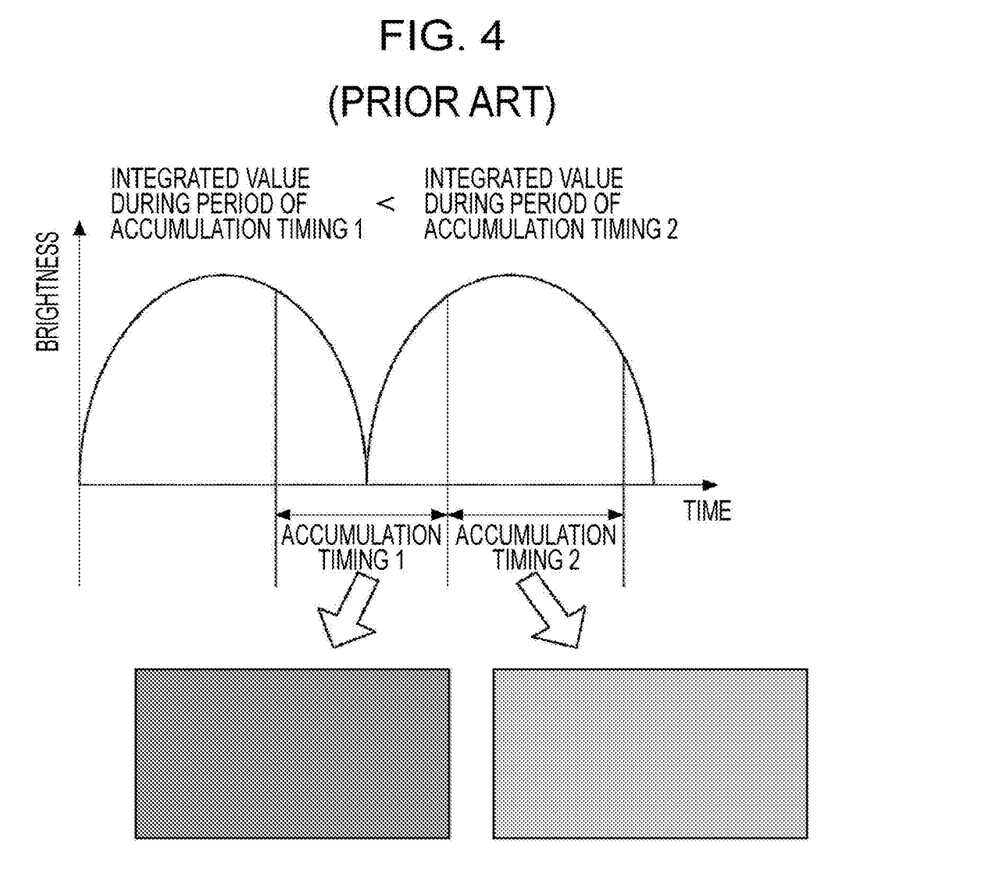
FIG. 4 is a diagram showing occurrence of flicker in an image pickup element employing the global shutter system, such as a CCD sensor.

FIG. 4 shows occurrence of flicker in an image pickup element employing the global shutter system, such as a CCD sensor.

As shown in FIG. 4, in a case where an image is captured in an environment where the brightness changes at a constant frequency, since the integrated electric charge value generated by an amount of light emitted from a light source is different from one field to another according to an accumulation period, a brightness of an output image changes field by field.

A specific example will now be described.

In a non-inverter-type fluorescent lamp that uses a power supply frequency of 50 Hz, a change in brightness occurs at intervals of 100 Hz (intervals twice the power supply frequency).

In such a light source environment, if an image is captured using the NTSC (National Television System Committee) system (60 fields per second), integrated electric charge values generated by an amount of light emitted from the light source, which are accumulated for individual fields, are not equal to each other. Thus, a brightness of an output image changes every field.

The reason is as follows. With the use of a power supply frequency of 50 Hz, 100 peaks as shown in FIG. 4 are produced per second, and 60 accumulation timings are defined with respect to the 100 peaks. If the peaks are equally divided into 60 sections, starting from the first peak, the integrated electric charge value differs depending on the peak.

In order to suppress such field flicker generated in an image pickup element such as a CCD sensor, an accumulation period is fixedly set to $1/100$ seconds. The timing of changes in brightness of a light source is synchronized with the timing of the electric charge accumulation of the image pickup element to suppress flicker.

With this method, the integrated electric charge values generated by accumulation of an amount of light emitted from the light source can be made constant regardless of the timing of exposure, and the influence of flicker can completely be suppressed.

Recently, CMOS sensors with lower power consumption and lower production cost than CCD sensors have attracted attention.

XY address image pickup elements such as CMOS sensors employ a rolling shutter system in which the timing of electric charge accumulation is matched with each of the accumulation lines of image pickup elements. The occurrence of flicker would not be suppressed by the technique described above.

Figure 5A:
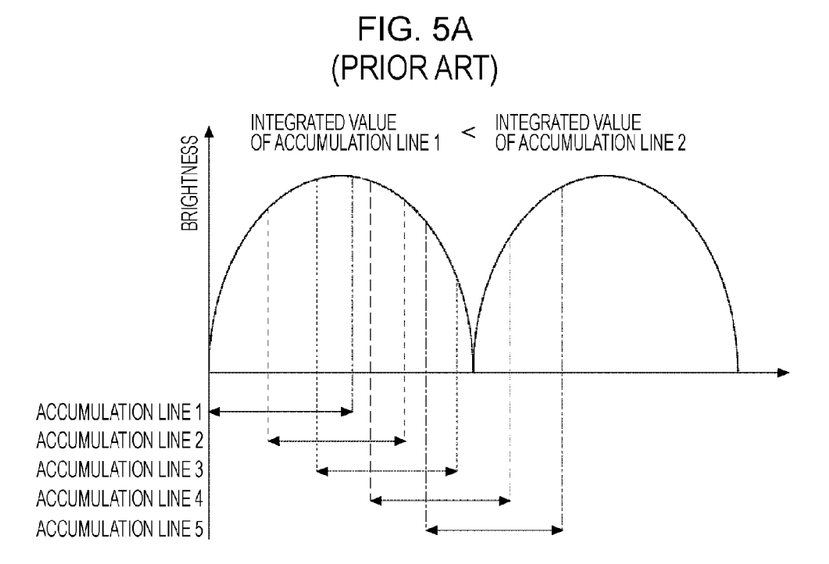
FIGS. 5A and 5B are diagrams showing occurrence of flicker in an image pickup element employing the rolling shutter system, such as a CMOS sensor.
Figure 5B:
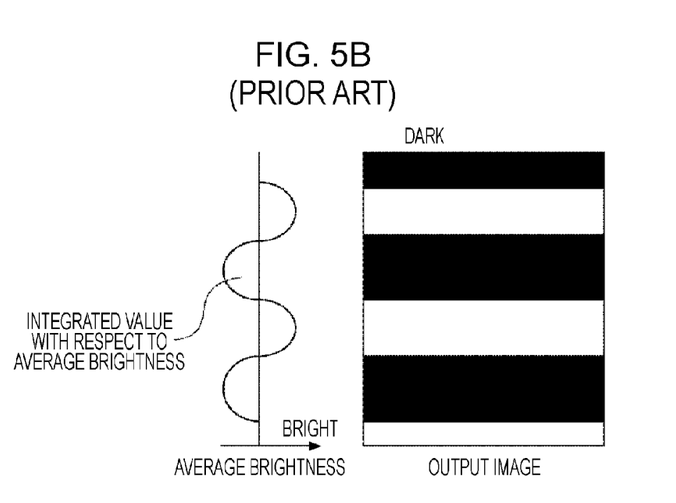

FIGS. 5A and 5B show occurrence of flicker in an image pickup element employing the rolling shutter system, such as a CMOS sensor.

As shown in FIG. 5A, the integrated electric charge value generated by an amount of light emitted from a light source is different from one accumulation line to another (for example, accumulation line 2 has a larger integrated value than accumulation line 1). As a result, unlike an image pickup element such as a CCD sensor, flicker appears in an output image within a field. As shown in FIG. 5B, high-brightness (bright) and low-brightness (dark) areas are produced, like a periodic wave, within the output image (referred to as line flicker).

In an image pickup element employing the rolling shutter system, such as a CMOS sensor, in order to suppress line flicker, a gain of each accumulation line of an image pickup element is adjusted using a gain correction circuit so that a difference in brightness due to a detected flicker component can be canceled.

In this technique, the detected flicker component is approximated to a sine wave, and the gain is adjusted so as to cancel the sine wave to perform correction.

Figure 6:
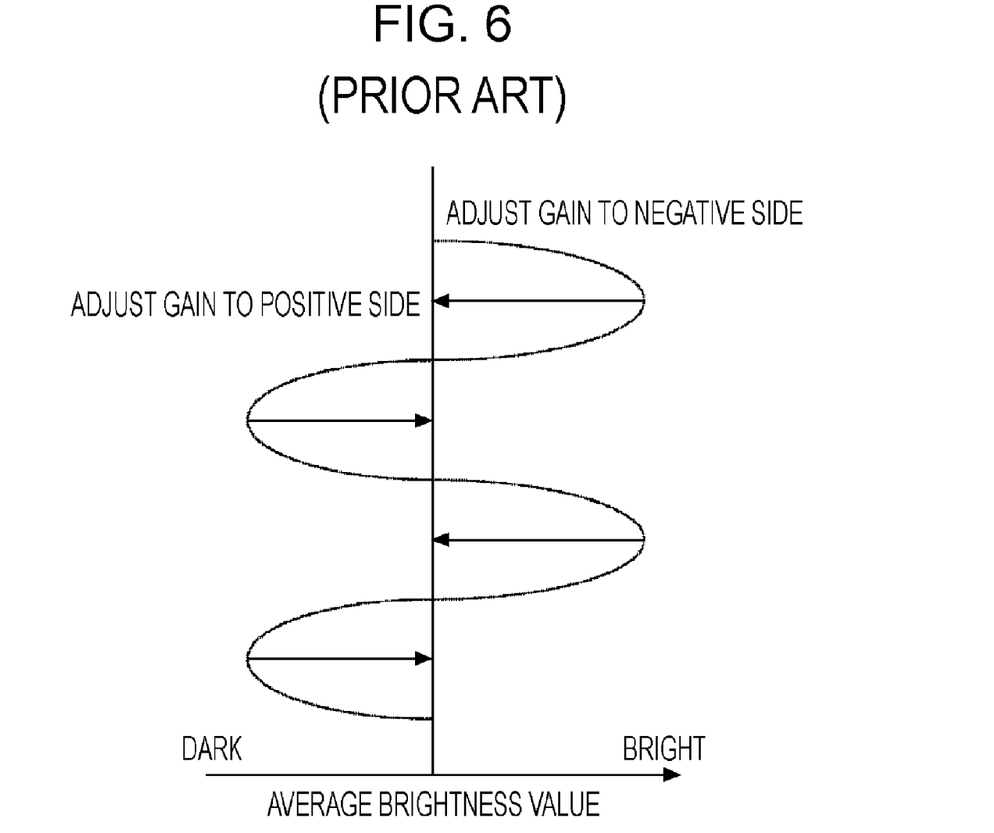
FIG. 6 is a diagram showing gain adjustment in a flicker correction process of the related art.

FIG. 6 is a diagram showing gain adjustment in a flicker correction process of the related art.

As shown in FIG. 6, a negative gain is applied to an accumulation line having a higher value than an average brightness value of an entire screen, and a positive gain is applied to an accumulation line having a lower value than the average brightness value to thereby adjust the brightness of the overall output image.

In this method, the flicker component that has occurred in the output image can be corrected by gain adjustment.

However, in a case where a gain value has been amplified because of a dark object to be photographed, a problem occurs. In this case, the original gain value is further amplified to a large value by gain adjustment. Thus, the noise component is also amplified in an accumulation line for which, as flicker correction, the gain is amplified to the positive side.

As a result, noise is enhanced and the signal-to-noise (S/N) ratio is reduced.

Furthermore, in an image subjected to flicker correction, gain values differ for individual accumulation lines of the image pickup element. The levels of the noise component also differ for the individual accumulation lines accordingly.

In addition, the difference between a gain value of an accumulation line for which gain adjustment is performed to the positive side and a gain value of an accumulation line for which gain adjustment is performed to the negative side is large. Thus, as with changes in brightness in line flicker, a noise component is generated like a periodic wave.

In gain adjustment, a noise component is amplified using an exponential function. If the difference between two gain values is large, a wave generated by the noise component appears more noticeable.

Japanese Patent Laid-Open No. 2006-303815 discloses a flicker correction method. In the flicker correction method, a flicker correction signal is generated from an output image before and after flicker correction, and the flicker correction signal is subtracted from the output image before flicker correction to correct flicker.

Then, a noise component is removed using a low-pass filter to improve the S/N ratio.

In the method disclosed in Japanese Patent Laid-Open No. 2006-303815, the low-pass filter can reduce the noise component but can also remove a high-frequency component, resulting in a reduction in the resolution of an output image.

It is therefore difficult to adjust the difference in brightness between accumulation lines in an output image, which is caused by flicker, while suppressing an increase in noise components and maintaining a high resolution.

SUMMARY OF THE INVENTION

The present invention is directed to the suppression of occurrence of flicker in an image signal captured by an XY address image pickup element such as a CMOS sensor.

According to an aspect of the present invention, an image pickup apparatus includes an image pickup element that captures an image of an object and that has a photoelectric conversion function, a flicker detection unit that detects flicker in an image signal obtained on the basis of an output signal of the image pickup element, and a correction unit that sets an accumulation period so that in a case where the flicker detection unit has detected flicker, a brightness value of an accumulation line having the lowest brightness value among accumulation lines in the image signal becomes equal to a target brightness value, and that after the brightness value of the accumulation line having the lowest brightness value becomes equal to the target brightness value, performs gain adjustment so that the brightness value indicated by each of the accumulation lines becomes equal to the target brightness value.

According to another aspect of the present invention, an image pickup apparatus includes an image pickup element that captures an image of an object and that has a photoelectric conversion function, and a flicker detection unit that detects flicker in an image signal obtained on the basis of an output signal of the image pickup element. In a case where the flicker detection unit has detected flicker, a flicker correction method is selected according to a gain value set in the image signal.

Further features of the present invention will become apparent from the following description of exemplary embodiments with reference to the attached drawings.

DESCRIPTION OF THE EMBODIMENTS

First Embodiment

Embodiments of the present invention will be described in detail hereinafter with reference to the drawings.

Figure 1:
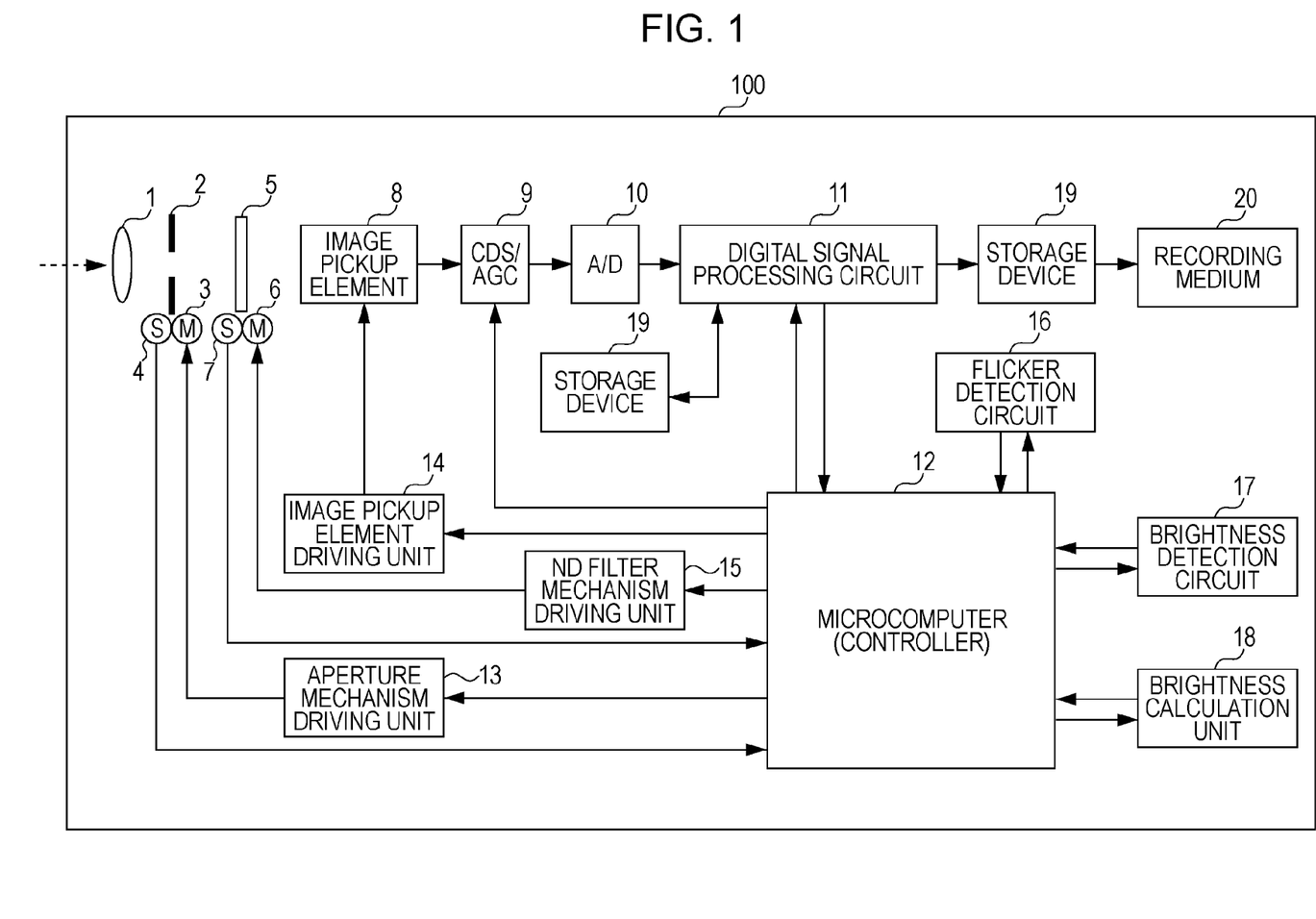
FIG. 1 is a schematic diagram showing an example structure of an image pickup apparatus according to an embodiment of the present invention.

FIG. 1 is a schematic diagram showing an example structure of an image pickup apparatus 100 according to an embodiment of the present invention.

Referring to FIG. 1, a lens 1 directs light entering from outside the image pickup apparatus 100 to the inside of the image pickup apparatus 100. In FIG. 1, only one lens is shown for simplicity. In actual use, a plurality of lenses is provided. An aperture 2 adjusts the amount of entering light. An aperture driving motor 3 drives the aperture 2. An aperture state detection circuit 4 detects the state of the driven aperture 2.

A neutral density (ND) filter 5 is driven by an ND filter driving motor 6. An ND filter driving detection circuit 7 detects the state of the driven ND filter 5. In the present embodiment, the image pickup apparatus 100 includes the ND filter 5. However, the image pickup apparatus 100 may not necessarily include the ND filter 5.

An image pickup element 8 captures an image of an object and has a photoelectric conversion function. For example, the image pickup element 8 may include a plurality of accumulation lines connected to individual pixels, which are arranged in either a row direction or a column direction, and electric charge of each pixel is read as an image signal through a corresponding one of the accumulation lines. The image pickup element 8 of the present embodiment is formed of an XY address image pickup element such as a CMOS sensor. However, the image pickup element 8 doesn't need to be a CMOS sensor. Any XY address image pickup element may be used as the image pickup element 8.

A correlated double sampling (CDS)/automatic gain control (AGC) circuit 9 performs sampling and amplification of an image signal based on electric charge accumulated in each pixel of the image pickup element 8. In the present embodiment, the CDS/AGC circuit 9 includes a gain adjustment circuit that adjusts a gain value of an image signal.

An analog-to-digital (A/D) conversion circuit 10 converts an output signal of the CDS/AGC circuit 9 into a digital signal. A digital signal processing circuit 11 performs various types of signal processing on the digital image signal output from the A/D conversion circuit 10.

A microcomputer 12 controls the overall operation of the image pickup apparatus 100 of the present embodiment. For instance, the microcomputer 12 performs various computation processes upon receipt of information from the digital signal processing circuit 11, such as brightness and color. An aperture mechanism driving unit 13 supplies power to the aperture driving motor 3 under the control of the microcomputer 12. An image pickup element driving unit 14 supplies driving pulses or the like to drive the image pickup element 8 under the control of the microcomputer 12.

An ND filter mechanism driving unit 15 supplies power to the ND filter driving motor 6 under the control of the microcomputer 12. If the image pickup apparatus 100 does not include the ND filter 5, the ND filter mechanism driving unit 15 may be omitted. A flicker detection circuit 16 detects flicker in an input image signal.

A brightness detection circuit 17 detects a brightness value of each accumulation line from an image signal fed from the microcomputer 12. A brightness calculation circuit 18 calculates a flicker component (difference between the brightness values detected by the brightness detection circuit 17 and an average brightness value of the image signal). A storage device 19 temporarily stores a captured image. A recording medium 20 records an image signal captured using the image pickup apparatus 100.

The flicker correction operation of the image pickup apparatus 100 of the present embodiment will be described with reference to FIGS. 3A to 3C.

Figure 3A:
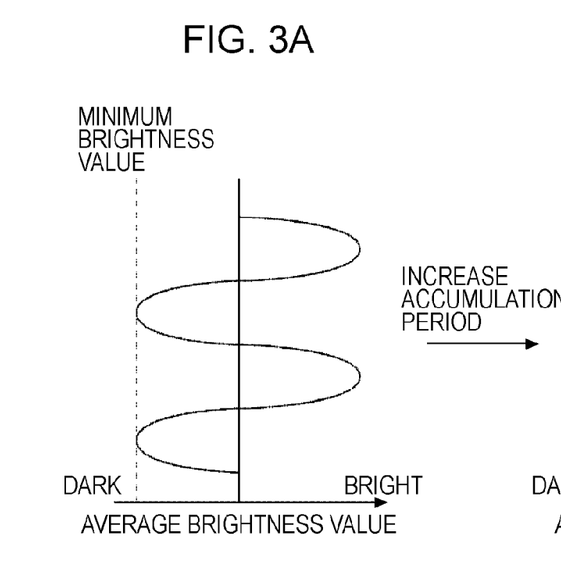
FIGS. 3A to 3C are diagrams showing a flicker correction operation of the image pickup apparatus according to the embodiment of the present invention.

FIG. 3A is a diagram showing occurrence of flicker.

Figures 3B, 3C:
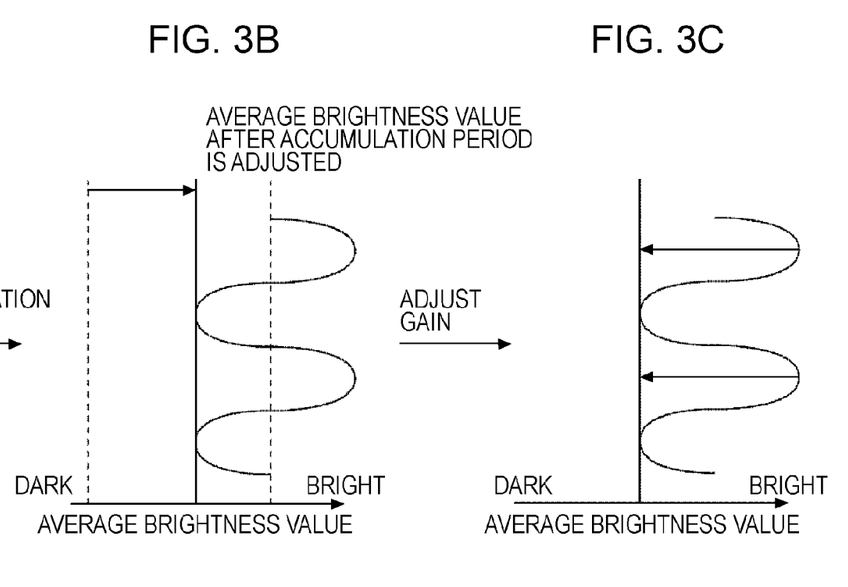

FIG. 3B is a diagram showing the controlling of an accumulation period so that a minimum brightness value of an entire image and an average brightness value of accumulation lines become equal to each other.

FIG. 3C is a diagram showing gain adjustment in an accumulation line whose brightness value exceeds the average brightness value.

In the operation of the image pickup apparatus 100 of the present embodiment, in order to correct flicker that has occurred in an image signal captured by the image pickup element 8, first, the image pickup element 8 photoelectrically converts an object image and outputs an image signal.

The output image signal is sampled and amplified by the CDS/AGC circuit 9, and is then converted into a digital signal by the A/D conversion circuit 10. The resulting signal is fed to the digital signal processing circuit 11.

The digital signal processing circuit 11 performs various types of signal processing on the digital image signal output from the A/D conversion circuit 10, and the result is sent to the flicker detection circuit 16 by the microcomputer 12.

The flicker detection circuit 16 performs detection of flicker in the input image signal.

If the flicker detection circuit 16 has detected flicker in the image signal, the brightness detection circuit 17 detects a brightness value of the image signal.

Then, the brightness calculation circuit 18 determines an average brightness value of each of the accumulation lines from the brightness value detected by the brightness detection circuit 17, and calculates the difference between the determined value and an average brightness value of an entire image. The average brightness value of each of the accumulation lines, as used herein, is a value that is determined by dividing the sum of brightness values of an accumulation line by the number of pixels constituting the accumulation line. The average brightness value of the entire image signal, as used herein, is a value that is determined by dividing the sum of brightness values of the entire image by the total number of pixels.

Then, as shown in FIG. 3A, the microcomputer 12 determines a brightness value of an accumulation line whose brightness value is the minimum among the average brightness value of each of the accumulation lines.

Then, the microcomputer 12 determines an accumulation period that makes the minimum brightness value larger so that the average brightness value of the accumulation line whose average brightness value is the minimum in the entire image can become equal to the average brightness value of the entire image.

Then, as shown in FIG. 3B, the determined accumulation period is transmitted to the image pickup element driving unit 14, and the accumulation period of the image pickup element 8 is changed. Since the accumulation period of the image pickup element 8 is changed to a longer period, the brightness difference between the minimum brightness value and maximum brightness value of the image signal is reduced compared with that before the accumulation period is changed.

Then, the difference between the brightness value of each of the accumulation lines and the average brightness value of the entire image is calculated by the microcomputer 12, and the calculated difference of the brightness value of each of the accumulation lines is converted into a gain value.

Next, as shown in FIG. 3C, the CDS/AGC circuit 9 serving as a gain adjustment circuit adjusts the gain value of each of the accumulation lines in the negative side on the basis of the calculated gain value to suppress occurrence of flicker.

While, in the present embodiment, the brightness calculation circuit 18 compares the average brightness value of each of the accumulation lines with the average brightness value of the entire image, the present invention is not limited to this embodiment. For example, the average value of the entire image may be compared with the value of each pixel to detect a difference therebetween.

In the present embodiment, for ease of explanation, all the circuits shown in FIG. 1 are illustrated as interconnected discrete components. All the components or a portion thereof may alternatively be included in the microcomputer 12.

Next, a control method performed by the image pickup apparatus 100 of the present embodiment will be described.

Figure 2:
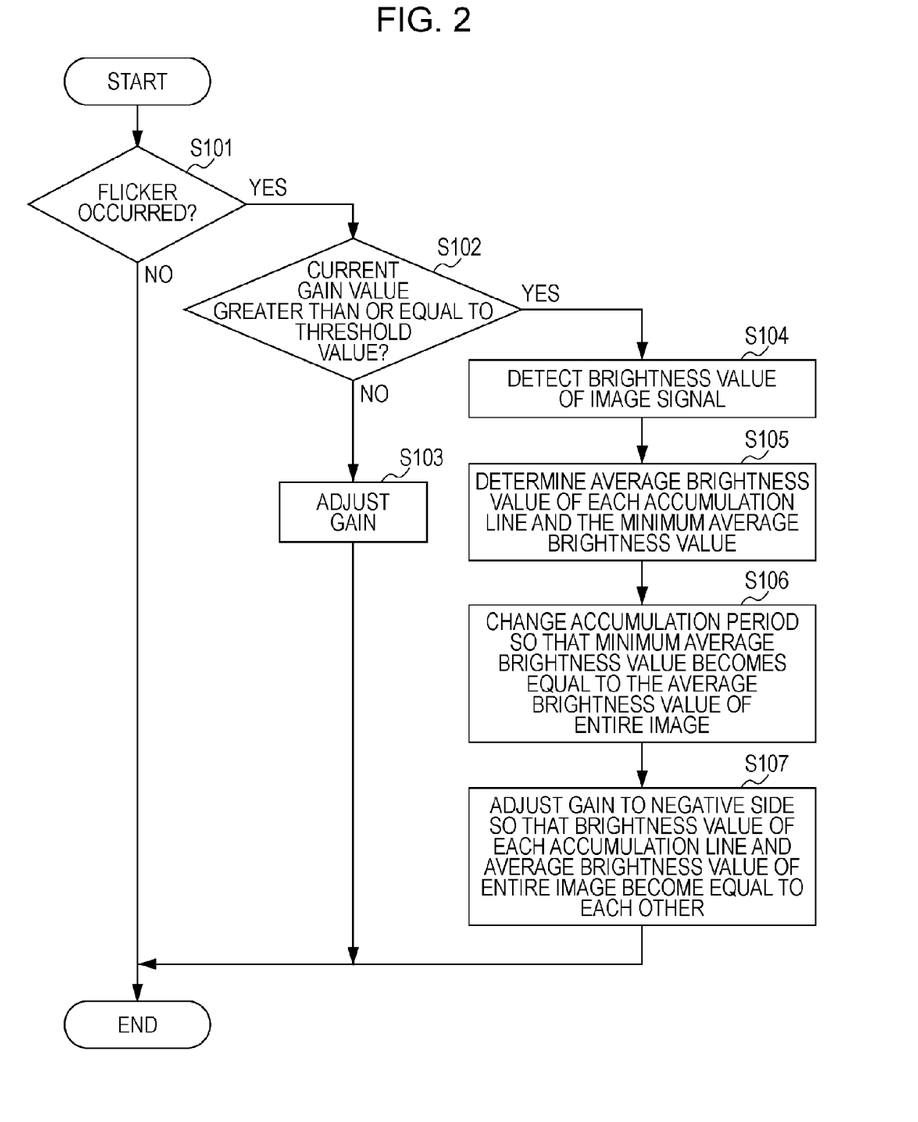
FIG. 2 is a flowchart showing a flicker correction control method performed by an image pickup apparatus according to an embodiment of the present invention.

FIG. 2 is a flowchart showing a flicker correction control method performed by the image pickup apparatus 100 according to an embodiment of the present invention.

A flicker detection process in step S101 stands by until the image pickup apparatus 100 of the present embodiment is powered on. In this embodiment, a flicker detection process is automatically performed when the image pickup apparatus 100 is powered on. Alternatively, a flicker detection process may be performed when a specific operation is performed. Furthermore, after the process of the flowchart ends, the process may be repeated immediately or after a certain period of time has elapsed.

In step S101, the flicker detection circuit 16 determines whether or not flicker has occurred in the input image signal.

In step S101, if the flicker detection circuit 16 has detected no flicker in the input image signal, a flicker correction operation is not performed. Then, the process in the flowchart ends.

If the flicker detection circuit 16 has detected flicker in the input image signal in step S101, the process proceeds to step S102.

In step S102, a gain value set in the input image signal is obtained. If the obtained gain value is greater than or equal to a predetermined value, the process proceeds to step S104.

If it is determined in step S102 that the gain value set in the input image signal is smaller than the predetermined value, the process proceeds to step S103 wherein a negative gain is applied to an accumulation line whose brightness value is higher than the average brightness value of the entire image, and a positive gain is applied to an accumulation line whose brightness value is lower than the average brightness value to adjust the brightness. After step S103, the process in the flowchart ends.

The predetermined value is set to as large a value as possible without degrading the resolution of an image. The level of tolerable noise differs from user to user, and the predetermined value may be manually set.

In step S104, the brightness detection circuit 17 detects a brightness value of the image signal.

In step S105, the brightness calculation circuit 18 determines an average brightness value of each of the accumulation lines from the brightness value detected by the brightness detection circuit 17, and calculates the difference between the determined value and the average brightness value of the entire image. Then, the microcomputer 12 detects a brightness value of an accumulation line whose brightness value is the minimum among the average brightness values of the accumulation lines.

In step S106, the microcomputer 12 determines an accumulation period that makes the minimum brightness value larger so that the average brightness value of the accumulation line whose average brightness value is the minimum in the entire image can become equal to the average brightness value (in step S105) of the entire image. The accumulation period is changed to the determined accumulation period.

An increase in the accumulation period may cause camera shake or blurring of an object image. In order to avoid such an inconvenience, a threshold value may be set for an accumulation period to prevent the shutter speed from being excessively lowered.

In step S107, the microcomputer 12 calculates the difference between the current average brightness value of each of the accumulation lines and the average brightness value (in step S105) of the entire image, and converts the calculated difference of the brightness value of each of the accumulation lines into a gain value. Then, the CDS/AGC circuit 9 adjusts the gain value of each of the accumulation lines to the negative side on the basis of the calculated gain value to suppress occurrence of flicker. After step S107, the process in the flowchart ends.

In the present embodiment, the accumulation period and the gain are controlled so that the average brightness value of each of the accumulation lines can become equal to the average brightness value of the entire image. However, the present invention is not limited to this embodiment.

For instance, the process described above may be performed so that a brightness value that is obtained with the correct exposure can become equal to the average brightness value of each of the accumulation lines.

In the process described above, in a case where the exposure of the input image is excessively higher or lower than correct exposure, the average brightness value of the entire image is also higher or lower than correct exposure. In this case, an image subjected to flicker correction may also suffer from overexposure or underexposure.

To correct for such overexposure or underexposure, a process is performed so that the average brightness value of the entire image and the average brightness value of each of the accumulation lines can become equal to each other when the correct exposure is obtained. Thus, even if the exposure of the input image is excessively higher or lower than the correct exposure, an image subjected to flicker correction has correct exposure.

In a case where the exposure of the input image is significantly lower than the correct exposure, the accumulation period is increased in order to perform a process so that the average brightness value of the entire image and the average brightness value of each of the accumulation lines can become equal to each other when the correct exposure is obtained. Due to the increase in the accumulation period, a user may feel uncomfortable during photographing.

In this case, the accumulation period is adjusted within a range (of a predetermined accumulation period) that does not make the user feel uncomfortable during photographing, and a brightness value obtained for the adjusted accumulation period may be set as a target brightness value to adjust the gain.

According to the present invention, therefore, a flicker correction method is selectable according to a gain value set in an image signal.

If the gain value set in the image signal is greater than or equal to a predetermined value, an accumulation period that makes the minimum brightness value larger is determined so that an average brightness value of an accumulation line whose average brightness value is the minimum in the entire image can become equal to the target brightness value. Since the accumulation is changed to a longer period, the brightness difference (amplitude of a wave) between the minimum brightness and maximum brightness value of the image signal is reduced compared with that before the accumulation period is changed.

With this process, gain adjustment to the positive side, which increases noise, can be reduced compared with flicker correction in which gain values are adjusted to the positive and negative sides.

Then, the difference between the brightness value of each of the accumulation lines and the target brightness value is calculated, and the calculated difference of the brightness value of each of the accumulation lines is converted into a gain value. The gain value of each of the accumulation lines is adjusted to the negative side on the basis of the calculated gain value to suppress occurrence of flicker.

With the processes described above, flicker correction can be performed with a small amount of gain adjustment without correcting the gain to the positive side. Therefore, flicker can be suppressed, while maintaining a high S/N ratio, without producing a periodic wave due to the noise component.

In addition, a device for suppressing the noise component, such as a low-pass filter, is not required in the processes described above, and correction can be performed without reducing the resolution compared with existing methods.

In the present embodiment, a flicker correction method is changed depending on the gain value set in the image signal. However, the present invention is not limited to this embodiment, and flicker correction may be performed by adjusting the shutter speed and adjusting the gain to the negative side.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-258887 filed Oct. 2, 2007, which is hereby incorporated by reference herein in its entirety.

What is claimed is:

1. An image pickup apparatus comprising:
an image pickup element that captures an image of an object;
a flicker detection unit that detects flicker in an image signal based on an output signal of the image pickup element;
a correction unit that performs gain adjustment so as to reduce unevenness of the brightness value caused by the flicker in the image signal; and
a setting unit that sets an accumulation period,
wherein the setting unit sets an accumulation period so that in a case where the flicker detection unit has detected flicker, a total number of accumulation lines to which a negative gain is applied is greater than a total number of accumulation lines to which a positive gain is applied in the gain adjustment by the correction unit.

2. A method for controlling an image pickup apparatus that includes an image pickup element, a flicker detection unit, a correction unit, and a setting unit, the method comprising:

capturing an image of an object using the image pickup element;

using the flicker detection unit to detect flicker in an image signal based on an output signal of the image pickup element;

using the correction unit to perform gain adjustment so as to reduce unevenness of the brightness value caused by the flicker in the image signal; and using the setting unit to set an accumulation period, wherein an accumulation period is set so that in a case where the flicker detection unit has detected flicker, a total number of accumulation lines to which a negative gain is applied is greater than a total number of accumulation lines to which a positive gain is applied in the gain adjustment by the correction unit.

* * * * *